United States Patent
Li et al.

(10) Patent No.: US 10,326,382 B2
(45) Date of Patent: Jun. 18, 2019

(54) MODULATION METHOD FOR DC TO DC CONVERTERS

(71) Applicant: The Florida State University Research Foundation, Inc., Tallahassee, FL (US)

(72) Inventors: Hui Li, Tallahassee, FL (US); Ran Mo, Tallahassee, FL (US); Yanjun Shi, Tallahassee, FL (US)

(73) Assignee: The Florida State University Research Foundation, Tallahassee, FL (US)

( * ) Notice: Subject to any disclaimer, the term of this patent is extended or adjusted under 35 U.S.C. 154(b) by 0 days.

(21) Appl. No.: 16/161,479

(22) Filed: Oct. 16, 2018

(65) Prior Publication Data
US 2019/0115840 A1   Apr. 18, 2019

Related U.S. Application Data

(60) Provisional application No. 62/572,759, filed on Oct. 16, 2017.

(51) Int. Cl.
| | |
|---|---|
| *H02M 7/757* | (2006.01) |
| *H02M 3/335* | (2006.01) |
| *H02J 3/36* | (2006.01) |
| *H02M 7/483* | (2007.01) |
| *H02M 1/00* | (2006.01) |

(52) U.S. Cl.
CPC ............. *H02M 7/7575* (2013.01); *H02J 3/36* (2013.01); *H02M 3/33515* (2013.01); *H02M 7/483* (2013.01); *H02M 7/757* (2013.01); *H02M 2001/0012* (2013.01); *H02M 2007/4835* (2013.01)

(58) Field of Classification Search
CPC ............. H02M 3/33515; H02M 7/483; H02M 2001/0012; H02M 2007/4835; H02M 7/7575; H02J 3/36
See application file for complete search history.

(56) References Cited

U.S. PATENT DOCUMENTS

| | | | |
|---|---|---|---|
| 8,711,586 B2* | 4/2014 | Yamada | H02M 1/14 363/41 |
| 10,218,285 B2* | 2/2019 | Mihalache | H02M 5/4585 |
| 2015/0180350 A1* | 6/2015 | Huang | H02J 7/0068 307/66 |
| 2017/0110977 A1* | 4/2017 | Mihalache | H02M 5/4585 |

* cited by examiner

*Primary Examiner* — Fred E Finch, III
*Assistant Examiner* — Rafael O. De León Domenech
(74) *Attorney, Agent, or Firm* — Meunier Carlin & Curfman LLC

(57) ABSTRACT

Disclosed is a phase-shifted square wave modulation technique for single-phase and three-phase IM2DC applications in HVDC/MVDC systems. A square wave based modulation waveform is applied to each cell of IM2DC and compared to the phase-shifted carrier waveforms to generate device gate signals. As a result, a higher equivalent switching frequency can be achieved, and square wave based arm and AC link waveforms will be generated. In addition, power flow of IM2DC can be controlled by a phase shift angle of the square modulation waveforms between HVS and LVS. The converter cell capacitors can be reduced in size because they are only required to smooth high switching frequency ripple components. In addition, lower TDR can be achieved due to the higher power transferring capability of square waves.

16 Claims, 7 Drawing Sheets

MODULATION METHOD FOR DC TO DC CONVERTERS

CROSS-REFERENCE TO RELATED APPLICATION

This application claims priority to and benefit of U.S. provisional patent application Ser. No. 62/572,759 filed Oct. 16, 2017, which is fully incorporated by reference and made a part hereof.

STATEMENT REGARDING FEDERALLY FUNDED RESEARCH

This invention was made with government support under Grant number N00014-16-1-2956 awarded by The Office of Naval Research. The government has certain rights in the invention.

FIELD OF THE INVENTION

The present disclosure relates to DC to DC converters and more specifically, to a phase-shifted, square-wave, modulation method for an isolated modular multilevel DC to DC converter (IM2DC), which improves its size, cost, and performance (e.g., in HVDC/MVDC applications).

BACKGROUND

HVDC/MVDC grids have gained increasing attention as an alternative to ac system for long-distance power transmission and distribution as well as renewable energy collection applications. The solid-state transformer (SST) plays an essential role for flexible dc power exchange and voltage regulation in HVDC/MVDC grids. The isolated modular multilevel dc/dc converter (IM2DC) gains increasing attentions recently as a promising topology for SST application. As the single-phase topology shown in FIG. 1 and the three-phase topology shown in FIG. 2, IM2DC comprises two modular multilevel converter (MMC) connected through a medium-frequency transformer, which provides the solution to dc/dc conversion with low-rating devices, superior fault performance and lower cost in HVDC/MVDC systems.

Various modulation methodologies have been proposed in IM2DC with distinct advantages as shown in FIG. 3 using single-phase topology modulation as an example. The phase-shifted sinusoidal modulation, which is widely applied in traditional MMCs with high quality ac output, can be used in IM2DC directly. Compared to the sinusoidal modulation, the two-level (2L) modulation generates a square wave ac-link voltage, which leads to a higher efficient power transfer capability. Recently a quasi-two-level (Q2L) modulation has been proposed for not only to achieve lower dv/dt but soft-switching capability as well. In addition, triangular modulation is discussed as well which exhibits lower harmonic components than 2L modulation and simpler implementation than sinusoidal modulation.

On the other hand, the IM2DC arm voltage and current waveforms varies with the same transmission power via different modulations, which affects both total device rating (TDR) and passive component size. Large cell capacitors are needed for sinusoidal modulation. Meanwhile, triangular modulation results in large arm RMS current leading to a higher TDR and conduction loss. With 2L and Q2L modulation, smaller capacitors and devices are applicable, however, the dc current ripples of dc inductor may be larger than those who use multi-cell interleaved modulation method.

A need, therefore, exists for a IM2DC modulation method that allows for a reduction in the size of passive components without a TDR penalty and that insures efficient power transfer.

SUMMARY

Accordingly, disclosed herein is a phase-shifted square wave modulation method that provides a quasi-two-level modulation which achieves low TDR and small cell capacitor/inductor size due to its multi-cell phase-shifted characteristics.

In various embodiments, a phase-shifted square wave modulation method for IM2DC is described and disclosed herein. In one of the embodiments, one square wave based modulation waveform with the same frequency and magnitude is applied to each cell of IM2DC and compared with a triangular carrier waveform to generate the gate signals. With the phase-shifted angle of the carrier waves, higher equivalent switching frequency can be achieved. Both full-bridge (FB) and half-bridge (HB) cells are allowed as the single cell. Due to the similarity, only the waveforms of the topology with HB cells are presented in the following description as examples.

Embodiments of the disclosed method can be implemented to reduce the dc inductor size due to higher equivalent switching frequency. In addition, the required capacitor energy can be reduced, which decreases the capacitor size since they are dedicated to smooth the high switching frequency ripples only. Moreover, a high efficient power transfer capability can be achieved with the square wave compared to conventional sinusoidal waveforms. Hence, small converter TDR can be achieved.

With the adjustable magnitude and dc offset of the square wave, the arm voltage and dc inductor voltage magnitude and frequency vary accordingly as shown in FIG. 4 using single-phase IM2DC with four cells within one arm as an example. The modulation index is desired to be nearly one to realize highest dc voltage utilization and smallest dc inductor size.

Embodiments described herein can utilize staircase waveforms or trapezoidal waveforms instead of pure square waveforms as shown in FIG. 5. Therefore, lower transformer ac link dv/dt can be achieved.

A phase-shift angle between the modulation waveforms of IM2DC high voltage side (HVS) and low voltage side (LVS) is applied to transfer the power as shown in FIG. 6. With the same magnitude of LVS and HVS modulation waveforms, the transformer current acts as the square wave if ignoring the phase-shift region which results in highest power transferring efficiency. The magnitude of LVS modulation waveform can also be adjusted to regulate the LVS dc bus voltage. However, the power transferring capability will be sacrificed.

The phase shift among the carrier waves can be either $2\pi/N$ within each arm as shown in FIG. 4, or $\pi/N$ within each phase as shown in FIG. 7, where N is the cell number in one arm. The DC bus current switching ripple frequency is twice in FIG. 7 compared to that in FIG. 4, which leads to smaller dc inductor size. However, the dc inductor current ripple magnitude increases, which may have adverse effects on reducing the DC inductor size.

Embodiments disclosed herein can be applied in a single-phase or a multi-phase topology. For example, in one aspect the disclosed method is applied in three-phase topology, as is presented in FIG. 8. The modulation waveforms and corresponding converter waveforms are similar among phases except with 120° phase difference.

As such, the various embodiments of the disclosed method provide an improved modulation method for IM2DC that requires smaller cell capacitors and dc inductors at the same time without TDR penalty.

The foregoing illustrative summary, as well as other exemplary objectives and/or advantages of the disclosure, and the manner in which the same are accomplished, are further explained within the following detailed description and its accompanying drawings.

DETAILED DESCRIPTION

In various embodiments, described herein are modulation methods for IM2DC, including single-phase and three-phase topologies, FB and HB cells. The methods provided herein can result in both smaller dc inductors and cell capacitors with the same power ratings as compared to conventional modulation technologies. In addition, smaller TDR can be achieved with the high efficient power transferring capability of square waves.

Figure 1:
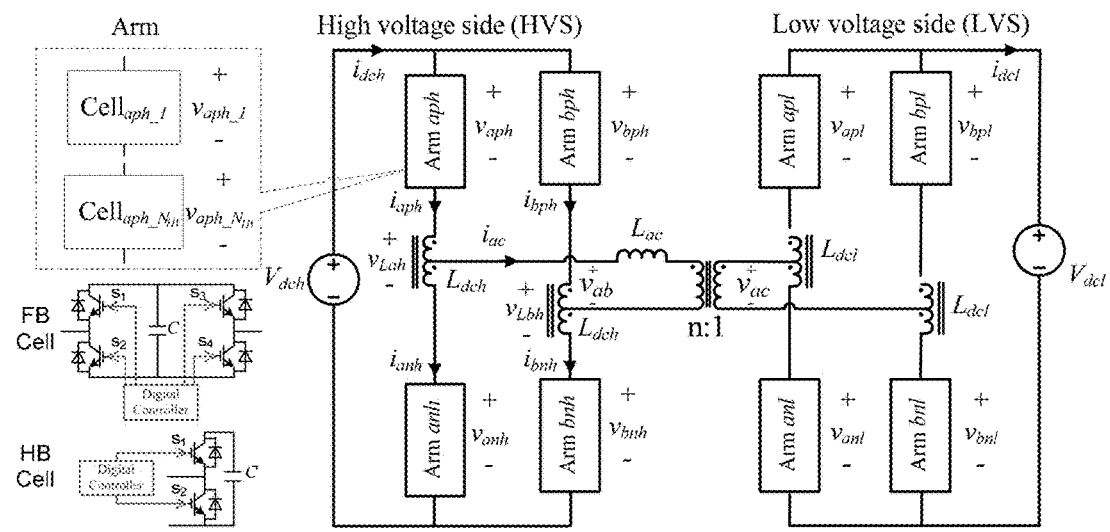
FIG. 1 is a circuit schematic of a single-phase IM2DC known in the prior art comprising of three two single-phase MMCs connected through a medium frequency transformer, wherein either FB or HB are cascaded in each arm.
Figure 2:
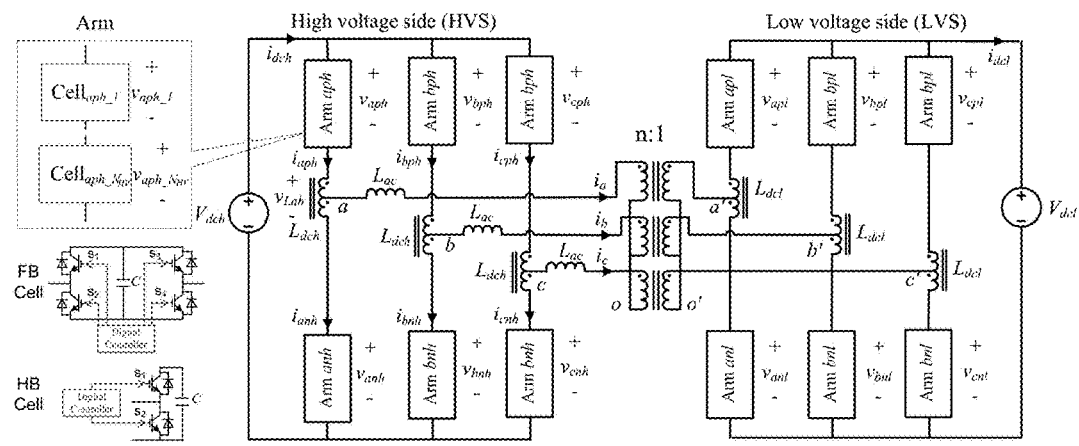
FIG. 2 is a circuit schematic of a three-phase IM2DC known in the prior art comprising of three two three-phase MMCs connected through medium frequency transformers, wherein either FB or HB are cascaded in each arm.
Figure 3:
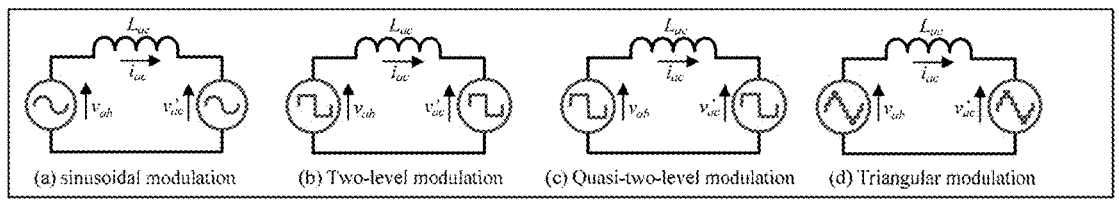
FIG. 3 is a diagram illustrating the conventional modulation methods known in the prior art, including the phase-shifted sinusoidal modulation, two-level modulation, quasi-two-level modulation and triangular modulation.
Figure 4:
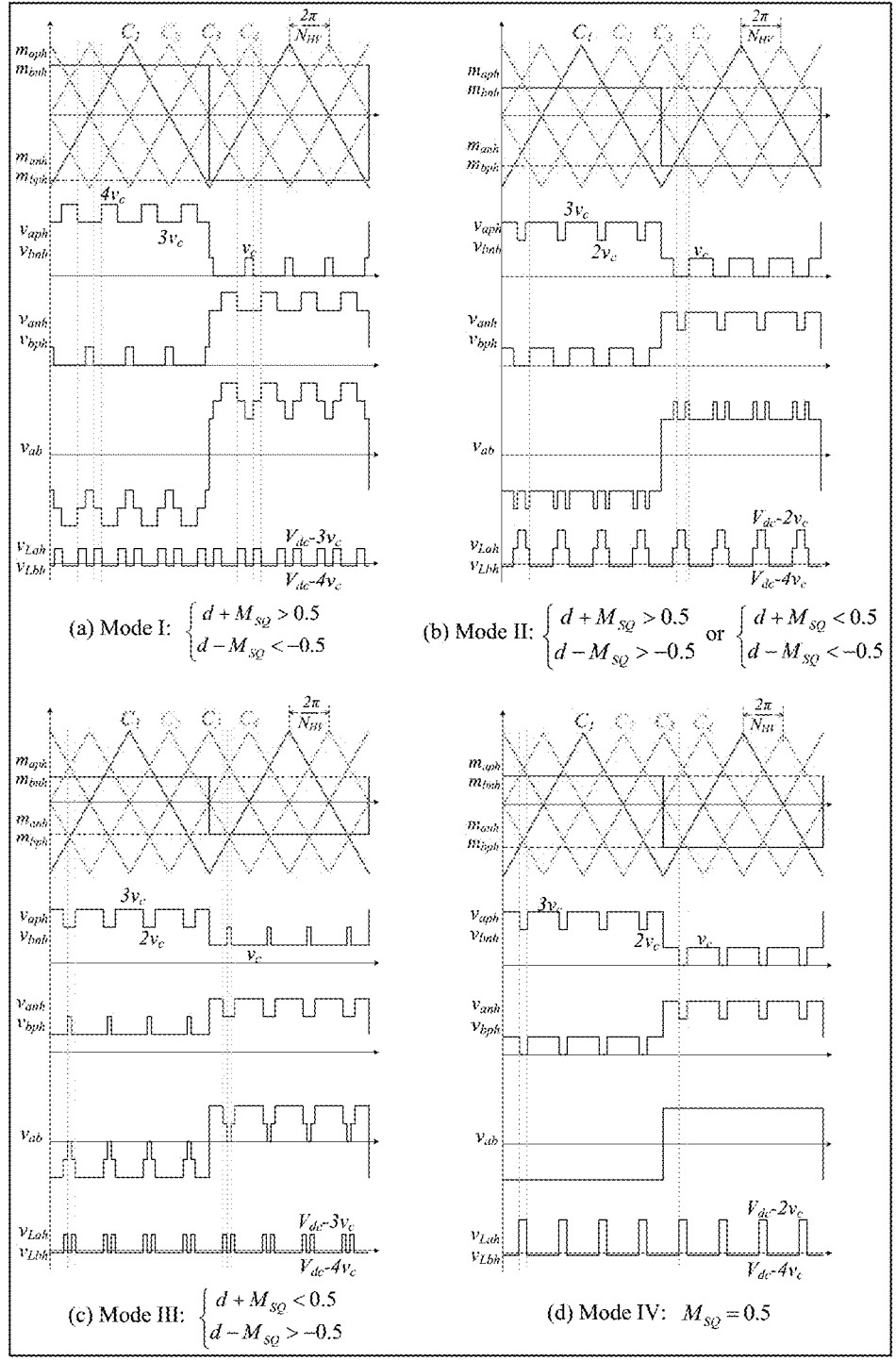
FIG. 4 is graphical illustration of the operation modes and corresponding HVS waveforms of a DC to DC converter as described herein when the cell number equals four with $2\pi/N$ phase-shifted carriers for single-phase IM2DC.

An exemplary embodiment is shown with reference to FIG. 4. The high voltage side (HVS) waveforms of a modulation strategy as well as the corresponding arm voltages and transformer voltage for the single-phase IM2DC are illustrated in FIG. 4, where four cells within one arm is selected as an example. A square waveform with 0.5 duty cycle is adopted as the modulation waveform, where magnitude $M_{SQ}$ and dc offset d are controllable. $m_{a(b)ph}$ and $M_{a(b)nh}$ of FIG. 4 are the modulation waveforms of phase a (b) upper arm and lower arm, respectively. $N_{HV}$ is the HVS cell number in one arm (4 in this example), $C_1$~$C_4$ are carrier waveforms. $m_{aph}$ is the same as $m_{bnh}$, which is 180° phase-shifted with the $m_{anh}$ and $m_{bph}$. A phase-shifted angle $2\pi/N_{HV}$, is applied among $C_1$~$C_4$, which increases the equivalent switching frequency and benefits natural balancing. As shown in FIG. 4, when the square modulation waveform varies with different $M_{SQ}$ and d, the generated arm voltage $v_{xyh}$ (x=a, b; y=p, n) and ac voltage $v_{ab}$ changes accordingly, resulting in four different operation modes. Among these operation modes, FIG. 4(a) is considered as the desired mode with largest modulation index since $v_{ab}$ can be as high as dc bus voltage $V_{dch}$, which achieves lowest converter TDR. In addition, the highest voltage ripple frequency and lowest ripple magnitude occur at the same time on the dc inductor voltage $v_{Lah}$ and $v_{Lbh}$ in this mode, which indicates the smallest inductor size can be achieved. When the modulation index becomes smaller as shown in FIG. 4(b)~(d), the dc voltage utilization ratio becomes lower and the converter TDR increases. When the modulation waveform magnitude equals to approximately 0.5 as shown in FIG. (d), the 2-level ac link waveform is generated, which loses the advantages of multilevel converter.

Figure 5:
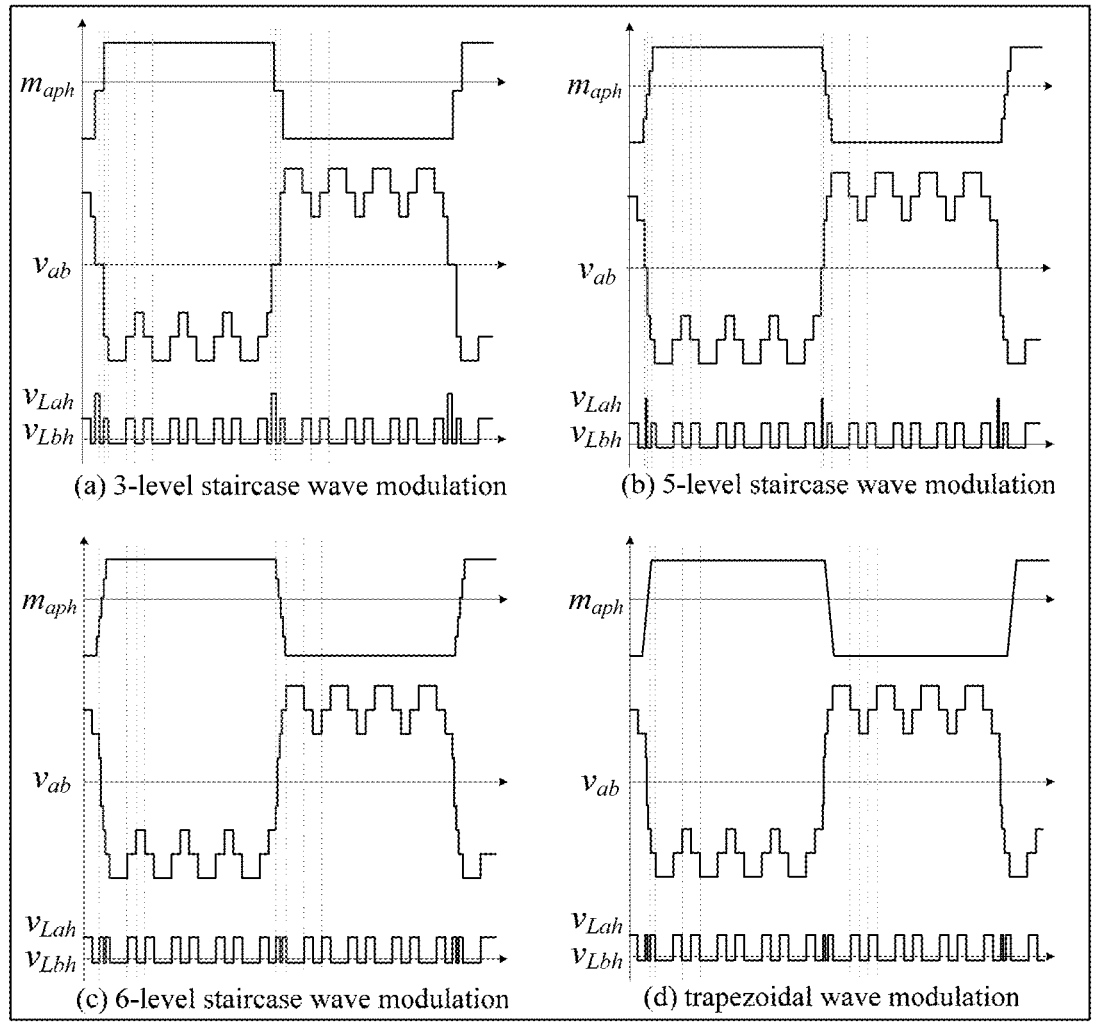
FIG. 5 is a graphical illustration of the HVS ac voltage and dc inductor voltage of a DC to DC converter as described herein with lower ac link dv/dt.

Next, an embodiment for reduced dv/dt is shown in FIG. 5. A staircase or trapezoidal modulation waveform instead of a square wave can be utilized to reduce the ac voltage dv/dt, FIG. 5(a)~(d) demonstrates $v_{ab}$ with different staircase and trapezoidal modulation waveforms. When the staircase level increases, $v_{ab}$ has more levels and smaller dv/dt, smaller dc current ripples can be obtained as well due to higher equivalent ripple frequency of $v_{Lah}$ and $v_{Lbh}$. FIG. 5 also indicates that 6-level staircase wave modulation already attains the same ac voltage level with that of trapezoidal wave modulation, which is adequate for reduced dv/dt performance.

Figure 6A:
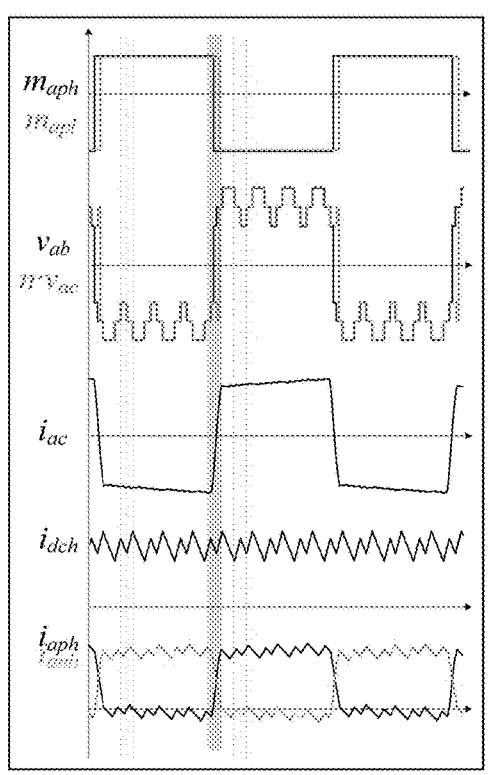
FIG. 6A is a graphical illustration of the corresponding converter waveforms of a DC to DC converter as described herein with the same modulation waveform magnitudes between HVS and LVS.
Figure 6B:
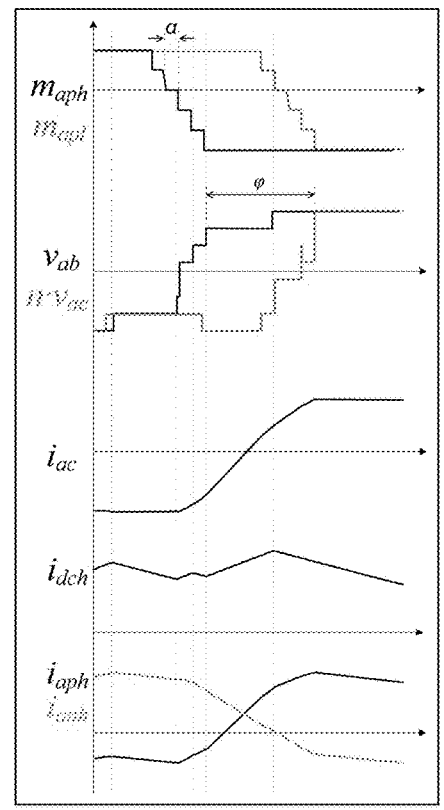
FIG. 6B illustrates an exploded view of the shaded area in FIG. 6A.

FIG. 6A depicts the key waveforms considering both HVS and LVS with the disclosed modulation method. The operation principle of LVS is similar to that of HVS, but with a phase shift angle φ to transfer the power. The magnitude of modulation waveforms in LVS equals to that of the HVS modulation waveform to ensure high efficiency. Similar to MMC, both dc bus current $i_{dch}$ and transformer current $i_{ac}$ flow though the cells, therefore the arm current contains both dc and ac components as shown in FIG. 6A using HVS phase a arm $i_{aph}$ and $i_{anh}$ as examples. Moreover, the small stair step angle α with acceptable dv/dt are preferred, otherwise the dc voltage utilization may be sacrificed. It is worth mentioning that the magnitude of modulation waveform can vary in the LVS to regulate the LVS dc bus voltage, however, the converter reactive power increases so the power transferring efficiency will be lower. FIG. 6B presents the zoomed view of the shaded area in FIG. 6A, which illustrates the staircase pattern of ac link voltage with lower dv/dt than pure square wave.

Figure 7:
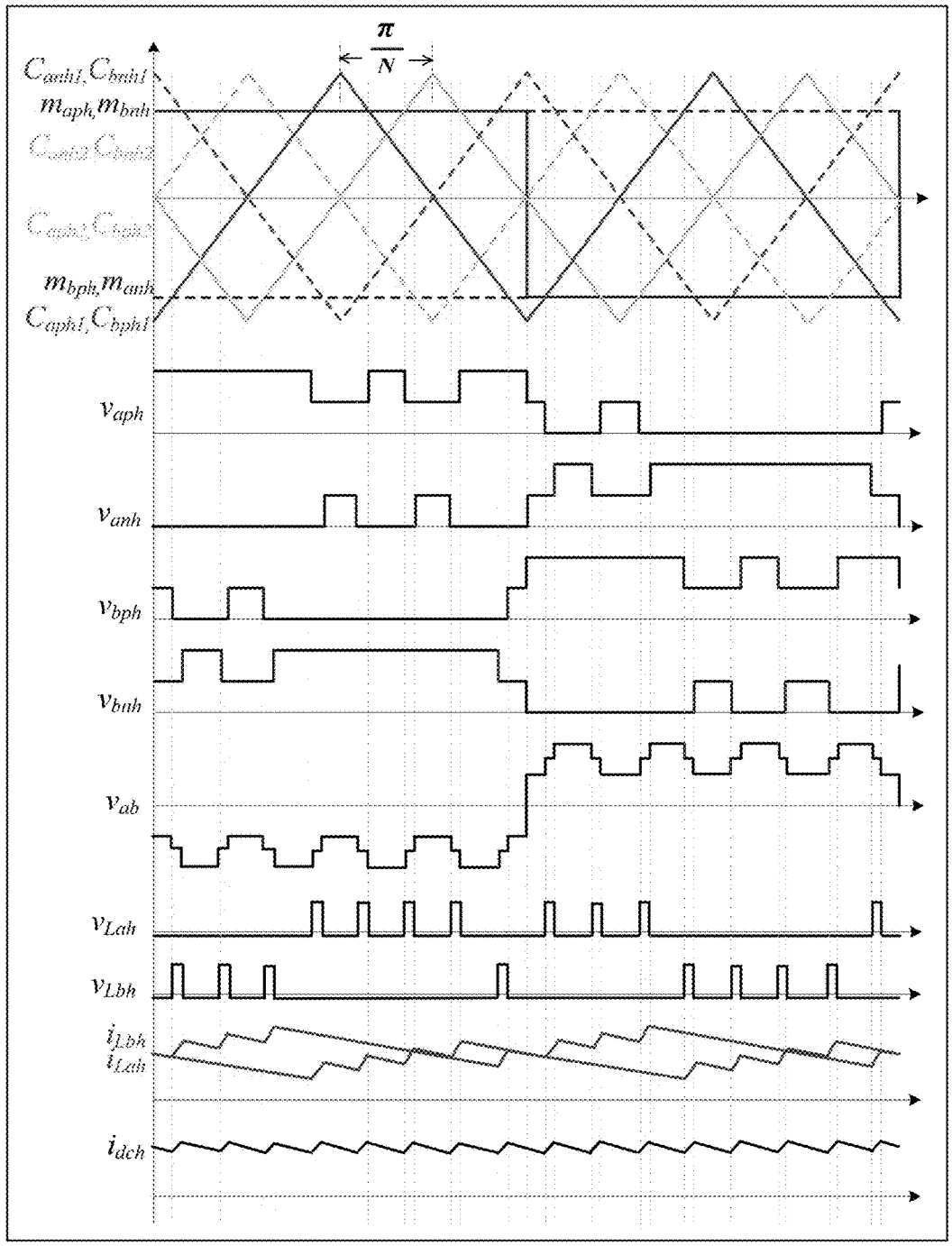
FIG. 7 is a graphical illustration of the corresponding HVS waveforms of a DC to DC converter as described herein when the cell number equals two with $\pi/N$ phase-shifted carriers for single-phase IM2DC.

The phase-shifted angle can also be $\pi/N_{HV}$ among the carriers in one phase. Consequently, it is possible to reduce the dc inductor further. As illustrated in FIG. 7, the cell number is selected to be two as an example. $C_{a(b)phi}$ and $C_{a(b)nhi}$ (i=1, 2) are the carrier waves for the ith cell of the upper arm and lower arm respectively in phase a(b) at HVS. A phase-shifted angle equaling to $\pi/N_{HV}$ exists among all the carriers within each phases. A large modulation index is applied to guarantee highest dc voltage utilization ratio. FIG. 7 shows that the corresponding dc inductor voltages of phase a and phase b are 180° phase shifted. Consequently, the dc inductor current of phase a and phase b are also 180° phase shifted. Therefore, the dc inductor current ripples of two phases cancels each other when flowing together, resulting in the dc bus current with twice switching ripple frequency and smaller ripple current compared to the case of $2\pi/N_{HV}$ phase-shifted carriers. In addition, higher control bandwidth can be achieved as well with higher equivalent switching frequency. However, the dc inductor current ripples become larger which may have adverse impacts on reducing the dc inductor size.

Figure 8:
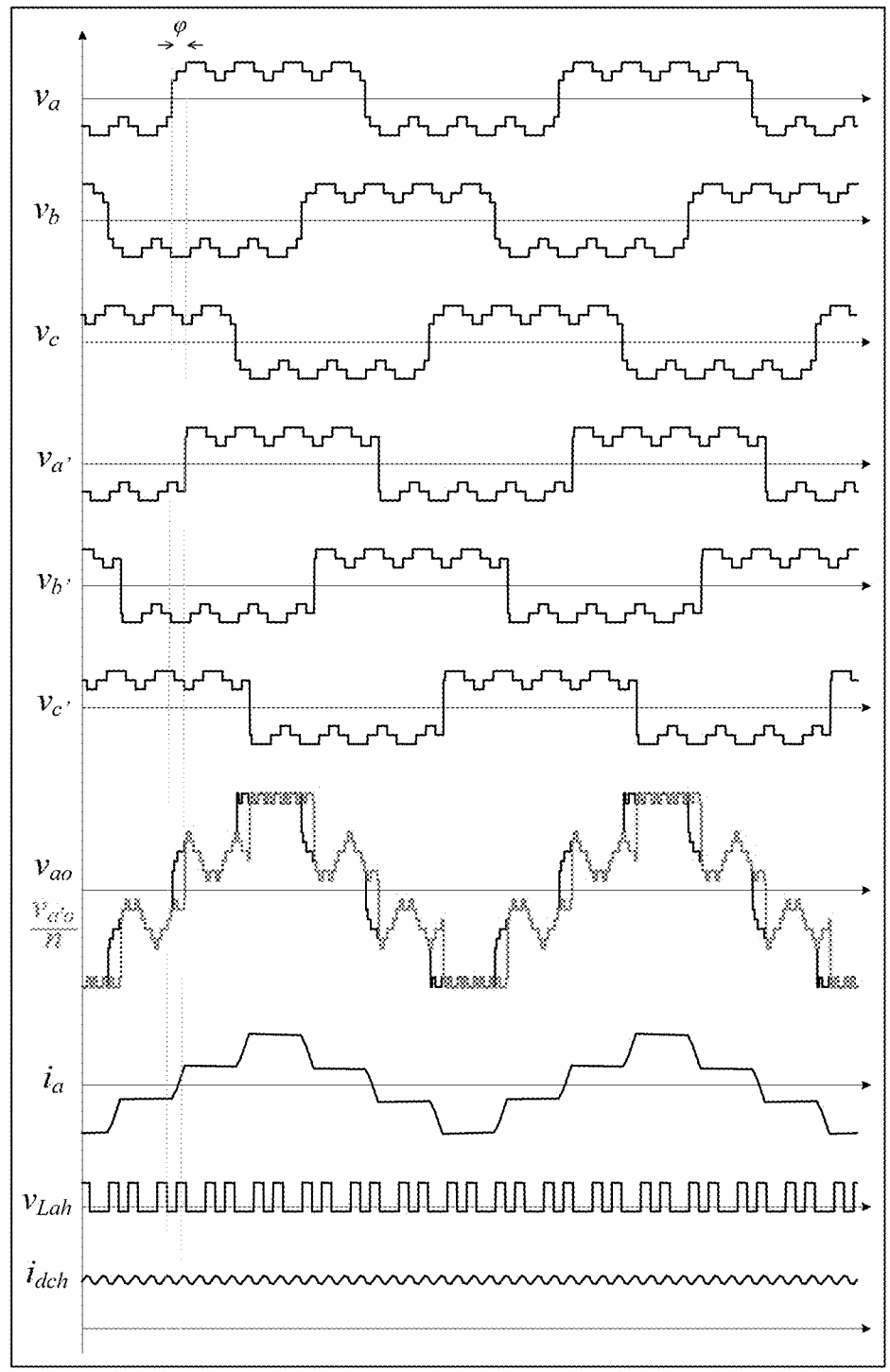
FIG. 8 is a graphical illustration of the corresponding waveforms of a DC to DC converter as described herein when the cell number equals four for three-phase IM2DC.

The embodiments described herein can be applied to the three-phase IM2DC topology as well utilizing the similar methods as previously described. The modulation waveforms and corresponding IM2DC key waveforms are illustrated in FIG. 8, where four cells in one arm with $2\pi/N$ phase-shifted carriers as an example. The modulation waveforms of upper arms and lower arms are 180° phase-shifted with a dc offset. The modulation and carrier waveforms of three phases are 120° phase-shifted. Therefore, the phase voltages $v_x$ and $v_{x'}$ (x=a, b, c) are 120° phase-shifted. A phase-shift angle $\varphi$ is applied between the HVS and LVS modulation waveform to transfer power. A staircase transformer current $i_x$ is generated. The dc current ripple frequency is as high as 2N times of the switching frequency leading to a reduced dc inductor size. Similar to the single-phase case, staircase or trapezoidal modulation waveforms can be employed instead of pure square waveforms to achieve lower ac link dv/dt.

Those skilled in the art will appreciate that the features described herein can be combined in various ways to form multiple variations of the disclosure. As a result, the invention is not limited to the specific examples described.

The invention claimed is:

1. A method for reducing power fluctuations in a DC to DC converter to reduce component requirements and improve efficiency, the method comprising: providing an isolated modular multilevel DC to DC converter (IM2DC) comprising a high-voltage side (HVS) modular multilevel converter (MMC) that is coupled by a transformer to a low-voltage side (LVS) MMC, wherein each MMC comprises arms, and wherein each arm includes one or more cells that each comprises a capacitor and switches to charge/discharge the capacitor according to gate signals; generating, using a digital controller, gate signals for each cell, wherein the generating comprises comparing a square waveform with a triangular waveform, and wherein the triangular waveform for each cell in an arm has a different phase; and applying the gate signals for each cell to the switches in each cell to produce an arm voltage, wherein the arm voltage has a square wave aspect and a high frequency aspect that reduce power fluctuations in the IM2DC during DC to DC conversion.

2. The method according to claim 1, wherein the square wave aspect reduces an energy storage requirement for the DC to DC conversion.

3. The method according to claim 2, wherein the reduced energy storage requirement reduces the size of the capacitors necessary for the IM2DC.

4. The method according to claim 1, wherein the square wave aspect increases the efficiency of the DC to DC conversion.

5. The method according to claim 1, wherein the increased efficiency decreases the total device rating (TDR) of the IM2DC.

6. The method according to claim 1, wherein the high frequency aspect reduces an inductance requirement for the DC to DC conversion.

7. The method according to claim 6, wherein the reduced inductance requirement reduces the size of inductors necessary for the IM2DC.

8. The method according to claim 6, wherein the high frequency aspect corresponds to a high equivalent switching frequency for the DC to DC conversion.

9. The method according to claim 1, wherein the IM2DC has a single-phase topology.

10. The method according to claim 1, wherein the IM2DC has a three-phase topology.

11. The method according to claim 1, wherein the IM2DC has a multi-phase topology.

12. The method according to claim 1, wherein the one or more cells are full-bridge cells.

13. The method according to claim 1, wherein the one or more cells are half-bridge cells.

14. The method according to claim 1, wherein phases of the triangular waveforms for the cells of an arm are separated by $2\pi/N$, wherein N is the number of cells in the arm.

15. The method according to claim 1, wherein the phases of the triangular waveforms for the cells of an arm are separated by $\pi/N$, wherein N is the number of cells in the arm.

16. The method according to claim 1, further comprising: performing DC to DC conversion using the IM2DC in a HVDC/MVDC application.

* * * * *